United States Patent

Ohno et al.

[11] 4,115,081
[45] Sep. 19, 1978

[54] PROCESS FOR SEPARATION OF A MIXED GAS

[75] Inventors: Masayoshi Ohno, Yokohama; Akio Kakuta, Kawasaki, both of Japan; Terukatsu Miyauchi, 75 Kashiwaba, Naka-ku, Yokohama-shi, Japan; Tatsuji Kikuchi, Tokyo, Japan

[73] Assignees: Tokyo Shibaura Electric Co., Ltd., Yokohama; Terukatsu Miyauchi, Kawasaki, both of Japan

[21] Appl. No.: 739,951

[22] Filed: Nov. 8, 1976

[30] Foreign Application Priority Data

Nov. 18, 1975 [JP] Japan .................... 50-138303

[51] Int. Cl.$^2$ ............................ B01D 53/14
[52] U.S. Cl. ............................ 55/64; 55/66; 55/70; 55/73; 55/89
[58] Field of Search .................... 55/63–66, 55/68, 70, 73, 84, 89

[56] References Cited

U.S. PATENT DOCUMENTS

| 2,921,648 | 1/1960 | Wetterholm et al. | 55/64 X |
| 3,503,186 | 3/1970 | Ward | 55/73 X |
| 3,658,463 | 4/1972 | Billings | 55/68 X |
| 3,907,972 | 9/1975 | Stautzenberger | 55/73 X |
| 3,909,206 | 9/1975 | Katz | 55/68 X |

FOREIGN PATENT DOCUMENTS 2,051,095 6/1971 Fed. Rep. of Germany ............ 55/68

OTHER PUBLICATIONS

Snyder, et al., *Introduction to Modern Liquid Chromatography*, 1974, John Wiley & Sons, Inc., pp. 215–223.

*Primary Examiner*—Charles N. Hart
*Assistant Examiner*—Robert H. Spitzer
*Attorney, Agent, or Firm*—Oblon, Fisher, Spivak, McClelland & Maier

[57] ABSTRACT

Separation of a mixed gas is carried out at ordinary temperatures by employing a silicone oil, or a certain high polymeric substance in liquid form or in solution as the solvent for absorbing the gas. Among others, methylphenyl silicone oil is preferably employed as the solvent in separating radioactive gases.

6 Claims, 3 Drawing Figures

PROCESS FOR SEPARATION OF A MIXED GAS

BACKGROUND OF THE INVENTION

This invention relates to a solvent absorption process for the separation of a mixed gas. More particularly, it relates to a process for separating a mixed gas by utilizing the differences in solubility of its constituents in a solvent.

Conventionally, a solvent absorption process for the separation of a mixed gas is well known as one of the processes for treating of waste gas containing radioactive components as discharged from atomic energy facilities including nuclear reactors or waste gas containing harmful components as released from a variety of plants. In this process, carbon tetrachloride $CCl_4$, various types of Freon (the trade name of fluorocarbons manufactured and sold by E. I. du Pont de Nemours & Co. Inc.) such as dichlorodifluoromethane $CCl_2F_2$ (Freon 12), etc. have been employed as the solvent for absorbing the gas. However, these solvents have the disadvantage of undergoing degradation upon exposure to radiation and thereby producing corrosive detrimental materials such as chlorine gas. Moreover, they are apt to vaporize during the gas separating operation due to their high vapor pressures, thus requiring a condenser for recovering the vaporized solvent. Particularly, Freons have a boiling point that is too low for a gas separating operation at ordinary temperatures.

In Table I below are shown the physical properties of some solvents heretofore in use and the solubilities of various gases in these solvents.

SUMMARY OF THE INVENTION

It is an object of this invention to provide solvents useful for absorbing the gas which solvents will exhibit gas separating performance comparable to that of prior art solvents, eliminate the possibility of producing detrimental materials as a result of degradation by radiation, and have a high boiling point and a low vapor pressure.

It is another object of this invention to provide a process for the separation of a mixed gas in which any one of such solvents is employed.

According to the present invention, mixed gases such as various kinds of waste gases are separated by passing them through a silicone oil, or a high polymeric substance in liquid form or in solution as a solvent.

DETAILED DESCRIPTION OF THE PREFERRED EMBODIMENTS

Figure 1:
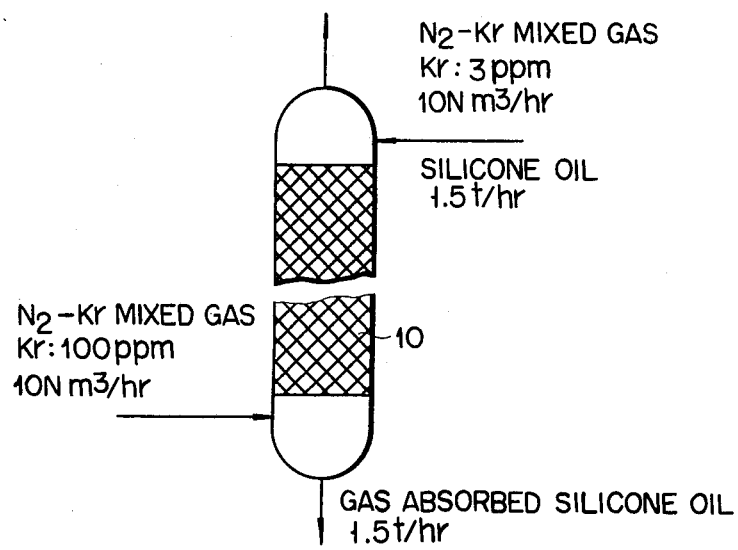
FIG. 1 is a diagram illustrating the solvent absorption step for $N_2$-Kr mixed gas in which a silicone oil is employed as the solvent in accordance with this invention.

The solvent absorption process for the separation of a mixed gas in accordance with this invention is characterized in that a silicone oil, or a high polymeric substance in liquid form or in solution is employed as the solvent.

The silicone oils which may be employed as the solvent for absorbing the gas in the practice of this invention are low molecular weight polymers, such as dimethyl polysiloxane, having a chain structure composed of siloxane bonds, and include various silicone oils now on the market. Some examples of such silicone oils are methyl silicone oil comprising dimethyl polysiloxane, methylphenyl silicone oil comprising methylphenyl polysiloxane, methylhydrogen silicone oil, polyoxyalkylene modified silicone oil, etc. Among others, methylphenyl silicone oil is preferably employed in separating radioactive gases.

In Table II below are shown the solubilities of various gases in Methyl Silicone Oil TSF 451 (the trade name of methyl silicone oil manufactured and sold by Toshiba Silicon Co., Ltd.).

Table I

Data on Some Prior Art Solvents

| Solvent | Temperature (°C) | Vapor Pressure (mmHg) | Boiling Point (°C) | Solubility (molar fraction) | | | | Solubility Ratio (Kr/$N_2$) |
|---|---|---|---|---|---|---|---|---|
| | | | | $N_2$ | Ar | Kr | Xe | |
| Carbon tetrachloride | 25 | 105 | 76.7 | $6.3 \times 10^{-4}$ | $1.1 \times 10^{-3}$ | $3.1 \times 10^{-3}$ | $1.3 \times 10^{-2}$ | 4.92 |
| Freon 12 | 0 | 2400 | −30 | $2.01 \times 10^{-3}$ | — | $10.6 \times 10^{-3}$ | $3.31 \times 10^{-2}$ | 5.32 |
| Freon 113 | 0 | 135 | 47.7 | $2.4 \times 10^{-3}$ | — | $8.5 \times 10^{-3}$ | $2.65 \times 10^{-2}$ | 3.54 |
| Toluene | 25 | <1 | 110.8 | $2.1 \times 10^{-3}$ | — | $8.8 \times 10^{-3}$ | $2.5 \times 10^{-2}$ | 4.19 |

Table II

Solubilities of Various Gases in Silicone Oil (25° C, 1 atm.)

| Gas | Solubility (molar fraction) | Gas | Solubility (molar fraction) |
|---|---|---|---|
| He | $3.2 \times 10^{-4}$ | NO | $1.90 \times 10^{-2}$ |
| $H_2$ | $5.5 \times 10^{-4}$ | $C_2H_6$ | $2.0 \times 10^{-2}$ |
| $N_2$ | $1.23 \times 10^{-3}$ | $N_2O$ | $2.13 \times 10^{-2}$ |
| Ar | $2.23 \times 10^{-3}$ | $H_2S$ | $4.00 \times 10^{-2}$ |
| $O_2$ | $2.35 \times 10^{-3}$ | $C_2H_5Cl$ | $1.24 \times 10^{-1}$ |
| $CH_4$ | $3.8 \times 10^{-3}$ | $SO_2$ | $1.40 \times 10^{-1}$ |
| Kr | $5.21 \times 10^{-3}$ | $NO_2$ | $3.01 \times 10^{-1}$ |
| $C_2H_2$ | $9.0 \times 10^{-3}$ | $CS_2$ | $5.00 \times 10^{-1}$ |
| $CO_2$ | $1.20 \times 10^{-2}$ | $C_2H_3CN$ | $9.60 \times 10^{-1}$ |
| Xe | $1.30 \times 10^{-2}$ | | |

The gases enumerated in this table exhibit substantially the same solubilities in silicone oils other than methyl silicone oil. Moreover, silicone oils have an extremely high boiling point as compared with the boiling points of the prior art solvents shown in Table I, a vapor pressure of $10^{-6}$ mmHg or less, and a solubility ratio (Kr/$N_2$) of 4.23 that is substantially the same as the values of the prior art solvents.

The high polymeric substances which may be employed as the solvent for absorbing the gas in the practice of this invention include, for example, cellulose acetate, polymethacrylonitrile, polyglycol terephthalate, polyvinyl chloride, polymethyl methacrylate, butadiene-acrylonitrile copolymer, polyvinyl acetate, butadiene-vinylpyridine copolymer, polystyrene, polybutadiene, styrene-divinylbenzene copolymer, polyisoprene, polyisobutylene, polyethylene, polytetrafluoroethylene, natural rubber, etc. Although high polymeric substances in liquid form may be used as the solvent without any modification, those in solid or highly viscous form should be used in the form of a solution in a suitable solvent. For example, polymethyl methacrylate should be dissolved in o-dichlorobenzen (b.p. 180.2° C), polystyrene and polyisobutylene in benzene (b.p. 80.1° C), and natural rubber in toluene (b.p. 110.6° C). Where a solvent is used in order to dissolve a high polymeric substance, it is desirable to provide a solvent recovery apparatus because the solvent will be more or less evaporated.

In Table III below are shown the solubilities of $N_2$ and Kr in these high polymeric substances.

Table III

Solubilities of $N_2$ and Kr in High Polymeric Substances

| High Polymeric Substance | Temperature (° C) | Solubility (molar fraction) $N_2$ | Solubility (molar fraction) $K_r$ | Solubility Ratio ($Kr/N_2$) |
|---|---|---|---|---|
| Cellulose acetate | 25 | $1.03 \times 10^{-4}$ | $6.4 \times 10^{-4}$ | 6.21 |
| Polymethacrylonitrile | 25 | $1.23 \times 10^{-4}$ | $7.77 \times 10^{-4}$ | 6.32 |
| Polyglycol terephthalate | 25 | $1.23 \times 10^{-4}$ | $7.77 \times 10^{-4}$ | 6.32 |
| Polyvinyl chloride | 25 | $3.08 \times 10^{-4}$ | $19.25 \times 10^{-4}$ | 6.25 |
| Polymethyl methacrylate | 25 | $3.32 \times 10^{-4}$ | $20.6 \times 10^{-4}$ | 6.20 |
| Butadiene-acrylonitrile copolymer(75:25) | 25 | $3.45 \times 10^{-4}$ | $21.3 \times 10^{-4}$ | 6.17 |
| Polyvinyl acetate | 25 | $3.58 \times 10^{-4}$ | $21.1 \times 10^{-4}$ | 6.16 |
| Butadiene-vinylpyridine copolymer | 25 | $3.72 \times 10^{-4}$ | $22.8 \times 10^{-4}$ | 6.13 |
| Polystyrene | 25 | $4.46 \times 10^{-4}$ | $26.6 \times 10^{-4}$ | 5.97 |
| Polybutadiene | 25 | $6.71 \times 10^{-4}$ | $36.6 \times 10^{-4}$ | 5.45 |
| Styrene-divinylbenzene copolymer | 25 | $6.71 \times 10^{-4}$ | $36.6 \times 10^{-4}$ | 5.45 |
| Polyisoprene | 25 | $7.63 \times 10^{-4}$ | $39.9 \times 10^{-4}$ | 5.25 |
| Natural rubber | 25 | $8.47 \times 10^{-4}$ | $42.7 \times 10^{-4}$ | 5.05 |
| Polyisobutylene | 25 | $8.63 \times 10^{-4}$ | $43.2 \times 10^{-4}$ | 5.01 |
| Polyethylene | 25 | $9.72 \times 10^{-4}$ | $46.4 \times 10^{-4}$ | 4.77 |
| Polytetrafluoroethylene | 25 | $2.24 \times 10^{-3}$ | $5.92 \times 10^{-3}$ | 2.64 |

The mixed gases which may be separated in the practice of this invention include the ones comprising at least two gases selected from among those enumerated in Table II above. For example, waste gas discharged from atomic energy facilities such as light water nuclear reactors is a mixed gas comprising nitrogen ($N_2$), krypton (Kr), xenon (Xe), hydrocarbons such as acetylene ($C_2H_2$), nitrogen oxides such as nitrogen dioxide ($NO_2$), etc. The present process for the separation of a mixed gas can be applied to the disposal of various kinds of such waste gases. The performance of a solvent in separating a mixed gas will depend upon the solubility ratios among its constituent gases.

Now, the present invention is further illustrated by the following example in which $N_2$-Kr mixed gas was separated by employing silicone oil as the solvent. Of course, the present process shall not be limited to this example.

In FIG. 1 illustrating the solvent absorption step for $N_2$-Kr mixed gas, $N_2$ gas containing 100 p.p.m. of Kr gas was continuously fed to the lower part of an absorption tower 10, while silicone oil was employed as the solvent for absorbing the gas was caused to flow downward from the top of absorption tower 10 at a rate of 1.5 ton/hr. Absorption tower 10 was a packed tower, in which Raschig rings of diameter 3B were packed to a height of 6 meters. Operations were carried out at a temperature of 25° C under a pressure of 15 atm. From the top of absorption tower 10, the treated gas consisting of $N_2$ gas having the Kr concentration decreased to 3 p.p.m. was discharged. The Kr concentration of the treated gas may be further decreased either by increasing the length or diameter of absorption tower 10 or by conducting a multistage operation.

Figure 2:
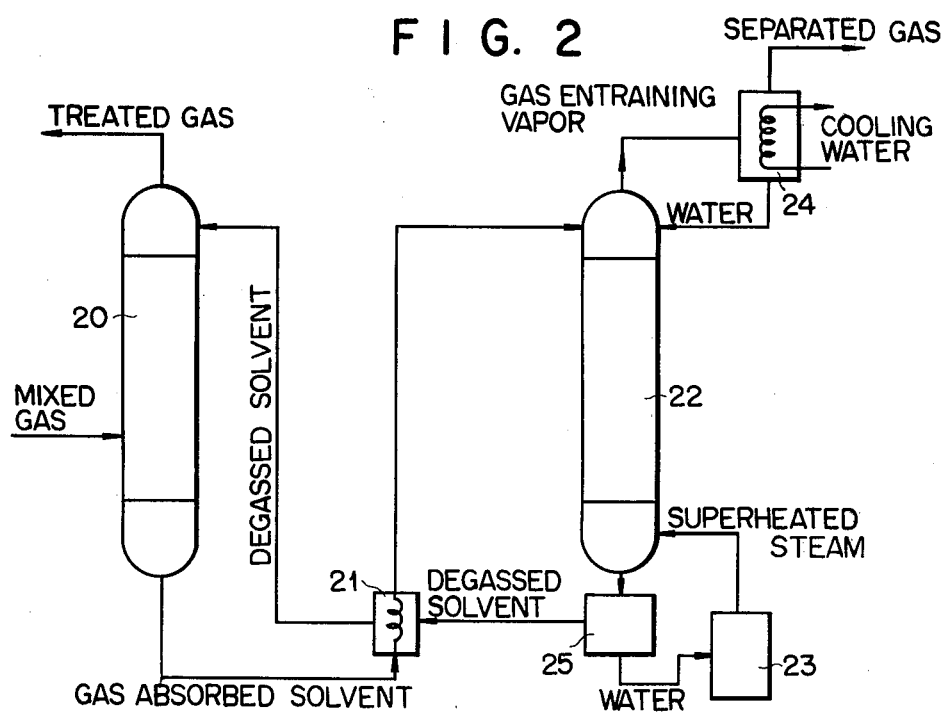
FIG. 2 is a schematic flow sheet illustrating one embodiment of the process for the separation of a mixed gas in accordance with this invention.

FIG. 2 illustrates one embodiment of the apparatus for separating a mixed gas, in which an absorption tower as described above is combined with a stripping tower for recovering the gas absorbed in the solvent. For example, if $N_2$-Kr mixed gas is fed to the lower part of an absorption tower 20, the solvent flowing downward from the top of absorption tower 20 absorbs Kr gas preferentially. This gas-absorbed solvent is removed from the bottom of absorption tower 20 and fed through a heat exchanger 21 to a stripping tower 22. That portion of the mixed gas which was not absorbed into the solvent is discharged from the top of absorption tower 20, and then discarded or recirculated. The gas-absorbed solvent flowing downward from the top of stripping tower 22 comes into contact with superheated steam fed from a steam generator 23 to the lower part of stripping tower 22. Upon exposure to elevated temperature and reduced pressure, the Kr gas is stripped from the solvent and discharged, together with the steam, from the top of stripping tower 22. The Kr gas-entraining steam enters a condenser 24, where the steam is condensed into water which is then returned to the upper part of stripping tower 22 and, on the other hand, the Kr gas is separated and recovered. The solvent and water containing no Kr gas any longer are removed from the bottom of stripping tower 22 and fed to a water separator 25. The water thus separated is returned to steam generator 23, while the solvent thus separated is fed through heat exchanger 21 to the top of absorption tower 20. In order to add a refluxing effect to absorption tower 20, a heating means may be provided below the stage at which the mixed gas is fed to absorption tower 20.

In place of the above-described packed towers, bubble cap towers, perforated plate towers, multistage bubble tower, etc. may be used for the absorption tower and the stripping tower. The stripping tower may be not only of the above-described superheated steam stripping type but also of reduced pressure or elevated temperature stripping type.

Moreover, it will be easy to those skilled in the art to modify the operating conditions for their own purposes. Furthermore, a fractionating tower may be provided between the absorption tower and the stripping tower in order to improve the gas separating effect.

Figure 3:
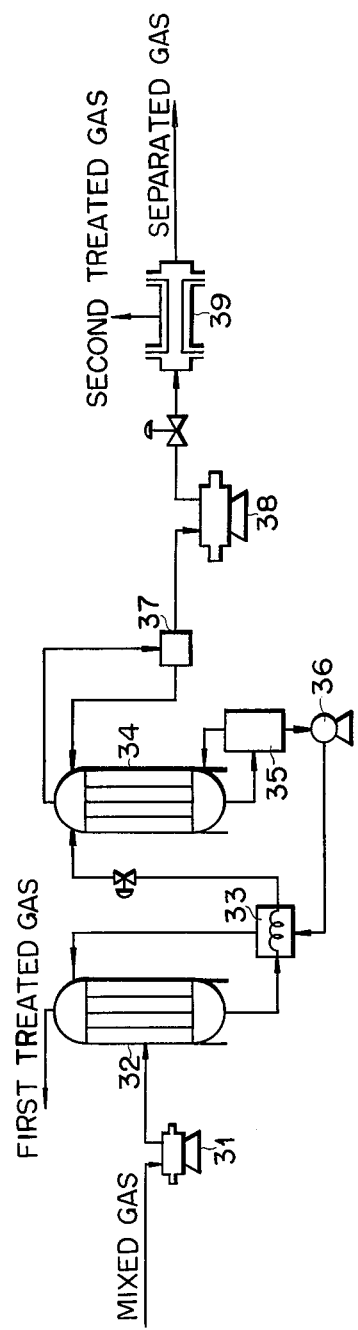
FIG. 3 is a schematic flow sheet illustrating another embodiment of the process for the separation of a mixed gas in accordance with this invention.

FIG. 3 illustrates another embodiment of the apparatus for separating a mixed gas which is useful for the practice of this invention. A mixed gas is first introduced into an absorption tower 32 and brought into contact with a solvent such as silicone oil, whereby the constituent gases that are readily soluble in the solvent are absorbed into the solvent and fed to a stripping tower 34. The gases stripped from the solvent in stripping tower 34 are then fed to a secondary gas separating equipment 39 of membrane type, where they are subjected to further separation. In FIG. 3, compression pumps are designated by reference numbers 31 and 38, a heat exchanger by 33, a steam boiler by 35, a circulating pump by 36, and a gas-liquid separator by 37. Thus, the solvent absorption process of this invention may be practiced in combination with conventional membrane and other processes in order to separate a mixed gas.

The present process for the separation of a mixed gas in which a silicone oil or a high polymeric substance is employed as the solvent for absorbing the gas has the following advantages, as compared with the prior art solvent absorption process.

(1) Since the solvent employed in the present process has an extremely high boiling point and a significantly low vapor pressure as compared with prior art solvents, operations can be carried out at ordinary temperatures.

(2) The present process is suited for the separation of radioactive gases because the solvent employed therein is unlikely to undergo degradation upon exposure to radiation. Among others, methylphenyl silicone oil having high resistance to radiation and heat is particularly suitable for the separation of radioactive gases.

(3) Since the solvent employed in the present process has a significantly low vapor pressure, no solvent vapor will be contained in the treated gas. Thus, the need of a condenser for recovering any solvent vapor is eliminated, which makes the gas separating equipment simpler.

(4) Since operation at ordinary tempratures are possible, the solvent and gas cooling devices which have been used in the practice of the prior art process can be omited, which again makes the gas separating equipment simpler.

What we claim is:

1. A process for the separation of a mixed gas comprising the step of passing said mixed gas through a solvent to separate said mixed gas by utilizing the differences in solubility of the constituent gases thereof in said solvent, wherein the improvement comprises employing a high polymeric substance selected from the group consisting of cellulose acetate, polymethacrylonitrile, polyglycol terephthalate, polyvinyl chloride, polymethyl methacrylate, butadiene-acrylonitrile copolymer, polyvinyl acetate, butadiene-vinylpyridine copolymer, polystyrene, polybutadiene, styrene-divinylbenzene copolymer, polyisoprene, polyisobutylene, polyethylene, and natural rubber in liquid form or in solution as said solvent.

2. The process according to claim 1 wherein said mixed gas comprises at least two gases selected from the group consisting of $H_2$, $N_2$, $O_2$, He, Ar, Kr, Xe, $CO_2$, NO, $N_2O$, $NO_2$, $SO_2$, $H_2S$, $CS_2$, $CH_4$, $C_2H_2$, $C_2H_6$, $C_2H_3Cl$, and $CH_2CHCN$.

3. The process according to claim 1, wherein the mixed gas to be selectively absorbed and separated contains at least one radioactive gas or gases.

4. A process for the separation of a mixed gas comprising the step of passing said mixed gas through a solvent to separate said mixed gas by utilizing the differences in solubility of the constituent gases thereof in said solvent, wherein the improvement comprises employing methylphenyl silicone oil as said solvent in order to separate said mixed gas.

5. A process for the separation of a mixed gas which comprises at least two gases selected from the group consisting of $H_2$, $N_2$, $O_2$, He, Ar, Kr, Xe, $CO_2$, NO, $N_2O$, $NO_2$, $SO_2$, $H_2S$, $CS_2$, $CH_4$, $C_2H_2$, $C_2H_6$, $C_2H_3Cl$, and $CH_2CHCN$, comprising the step of passing said gas through a solvent to separate said mixed gas by utilizing the differences in solubility of the constituent gases thereof in said solvent, wherein the improvement comprises employing methylphenyl silicone oil as said solvent in order to separate said mixed gas.

6. A process for the separation of a mixed gas containing at least one radioactive gas comprising the step of passing said mixed gas through a solvent to separate said mixed gas by utilizing the differences in solubility of the constituted gases thereof in said solvent, wherein the improvement comprises employing methylphenyl silicone oil as said solvent in order to selectively absorb and separate at least one radioactive gas or gases from said mixed gas.

* * * * *